(12) United States Patent
Lenzini et al.

(10) Patent No.: US 9,307,413 B2
(45) Date of Patent: Apr. 5, 2016

(54) MANAGEMENT OF RADIO FREQUENCIES IN A WIRELESS OR HYBRID MESH NETWORK

(75) Inventors: Luciano Lenzini, Leghorn (IT); Enzo Mingozzi, Pisa (IT); Luca Bisti, Pisa (IT); Torquato Bertani, Milan (IT); Alessandro Erta, Barbarasco Tresana (IT); Umberto Malesci, Milan (IT)

(73) Assignee: FLUIDMESH NETWORKS S.R.L., Milan (IT)

( * ) Notice: Subject to any disclaimer, the term of this patent is extended or adjusted under 35 U.S.C. 154(b) by 784 days.

(21) Appl. No.: 13/442,553

(22) Filed: Apr. 9, 2012

(65) Prior Publication Data

US 2012/0258749 A1  Oct. 11, 2012

(30) Foreign Application Priority Data

Apr. 11, 2011 (EP) .................................... 11003011

(51) Int. Cl.
*H04B 7/00* (2006.01)
*H04W 16/14* (2009.01)
*H04W 16/06* (2009.01)
*H04W 72/04* (2009.01)
*H04W 84/18* (2009.01)

(52) U.S. Cl.
CPC .............. *H04W 16/14* (2013.01); *H04W 16/06* (2013.01); *H04W 72/0406* (2013.01); *H04W 84/18* (2013.01)

(58) Field of Classification Search
USPC ........................................................ 455/509
See application file for complete search history.

(56) References Cited

U.S. PATENT DOCUMENTS

| | | | |
|---|---|---|---|
| 2004/0156336 A1* | 8/2004 | McFarland et al. | 370/329 |
| 2005/0068930 A1 | 3/2005 | Choi et al. | |
| 2005/0192016 A1 | 9/2005 | Zimmermann et al. | |
| 2007/0124443 A1 | 5/2007 | Nanda et al. | |
| 2009/0116400 A1 | 5/2009 | Sekiya et al. | |
| 2009/0201851 A1* | 8/2009 | Kruys et al. | 370/328 |

FOREIGN PATENT DOCUMENTS

| | | |
|---|---|---|
| CN | 101621837 A | 1/2010 |
| EP | 1773085 A1 | 4/2007 |

(Continued)

OTHER PUBLICATIONS

Mark Briggs, Dynamic Frequency Selection (DFS) and the 5GHz Unlicensed Band, published at www.elliotlabs.com, Oct. 25, 2010, Elliott Laboratories, Freemont, California, USA.

(Continued)

*Primary Examiner* — Ankur Jain
(74) *Attorney, Agent, or Firm* — Patzik, Frank & Samotny Ltd.

(57) ABSTRACT

In a wireless or hybrid mesh communication system, radio frequencies are managed by assigning an in-use frequency channel to each local family of nodes, distributing spare frequency channel(s) among the local families of nodes, and changing the in-use frequency channel of at least one selected local family of nodes to a new frequency channel selected among its spare frequency channel(s), if any, or among the spare frequency channel(s) of another local family of nodes if said at least one selected local family of nodes has no spare frequency channel(s), and/or as the in-use frequency channel of another local family of nodes if none of said local families of nodes has spare frequency channel(s).

12 Claims, 9 Drawing Sheets

(56) References Cited

FOREIGN PATENT DOCUMENTS

WO    2006110404  A2    10/2006
WO    2009145930  A2    12/2009

OTHER PUBLICATIONS

English translation of Abstract of Chinese Publication No. 101521837(A), published Jan. 6, 2010.
European Patent Office, Search Report issued in priority EP Application No. 11003011.1, Dated Sep. 19, 2011.
Applicant's Amendments and Corrections submitted to the European Patent Office on Apr. 5, 2012 in conjunction with the request for examination in related parent application, EP11 003 011.1-2412.
European Patent Office, Communication Pursuant to Article 94(3) EPC issued in connection with related parent application, EP11 003 011.1-2412, dated Aug. 30, 2012.
Applicant's reply to European Patent Office Communication Pursuant to Article 94(3) EPC filed on Oct. 31, 2012 in related parent application, EP11 003 011.1-2412.
European Patent Office, Communication Under Rule 71(3) EPC, "Intention to Grant" and appended text of intended grant, issued in connection with related parent application, EP11 003 011.1, dated Jun. 10, 2015.

* cited by examiner

MANAGEMENT OF RADIO FREQUENCIES IN A WIRELESS OR HYBRID MESH NETWORK

CROSS-REFERENCE TO RELATED APPLICATIONS

This application claims the benefit of European patent application No. 11003011.1, filed Apr. 11, 2011, the entirety of which is hereby incorporated by reference.

BACKGROUND OF THE INVENTION

1. Field of the Invention

The present invention relates generally to the management of radio frequencies in a wireless mesh network (WMN), that may however have one or more wired links thus forming a hybrid network.

For the sake of brevity, WMN will be mostly referred to hereinbelow.

More in particular, the present invention relates to communication nodes, a communication system, and a method of managing radio frequencies within a wireless or hybrid mesh communication system.

In the present description and in the attached claims, "communication node" is used to indicate a single entity from a logical point of view, but may refer to a single device, a group of devices, or a portion of a device from a physical point of view.

2. Description of Related Art

It is increasingly common to interconnect several fixed and mobile electronic appliances, such as computers and peripherals therefor, handheld digital devices like personal digital assistants and cell phones, data collection devices and sensors for example for area video surveillance, and so on. Said devices, as well as dedicated network apparatus or access points coupled to the devices, comprise the nodes or stations or units or terminals of the communication system. Term network will be used herein as a synonymous of term communication system.

The connection or links among the nodes may exploit several physical media, such as electric wires, buses and optical fiber, as well as wireless media such as radio frequency and infrared electromagnetic radiation.

While wired communication systems are still broadly used, wireless and hybrid type communication systems are increasingly common due to their flexibility of installation, allowing for mobile devices to interconnect with each other and/or with an infrastructure.

WMNs, when operating in the 5 GHz band, should comply with Dynamic Frequency Selection (DFS) requirements in order to give priority to radar transmission. Such requirements are presently dictated, in Europe, by ETSI standard EN 301 893, and in the U.S. by FCC rules, Title 47, Part 15.

The basic DFS requirements are that, in case a radar signal is detected on a given channel or frequency—referred to as a DFS event —, the node(s) operating on said channel must promptly clear the channel and refrain from using it for a specified time after the DFS event; and that before (re)using a channel, the node(s) must monitor it for ensuring absence of radar signals.

More in particular, the standards presently define the following quantities and figures, which are provided hereinbelow just as a non limiting example:

Channel Availability Check Time TCAC: the time a system shall monitor a channel for presence of radar prior to initiating a communications link on that channel. Amounts to 60 seconds outside 5600-5650 MHz or 10 minutes for 5600-5650 MHz sub-band.

Channel Move Time TCM: the time for the system to clear the channel and measured from the end of the radar burst to the end of the final transmission on the channel. Amounts to 10 seconds.

Channel Closing Transmission Time TCCT: the total, or aggregate, transmission time from the system during the channel move time. Amounts to 1 second in ETSI regulation.

Non-Occupancy Time TNO: a period of time after radar is detected on a channel that the channel may not be used. Amounts to 30 minutes.

A practical implementation of a wireless or hybrid mesh network compliant with such requirements cannot refrain to communicate for the entire TNO, and must therefore provide for switching to another channel upon detection of a DFS event. The standards themselves do not provide for any indication of how to perform channel changes.

WO 2009/145930 A2 and US 2009/0201851 A1, assigned to Cisco Technology, Inc., and entitled "Coordinated Channel Change in Mesh Networks", disclose two methods to reconfigure channels frequencies in the WMN in a distributed and coordinated manner and it explicitly considers the radar interference scenario. The considered WMN topology is a tree where the root mesh access point serves as a central point which coordinates the channel reassignment operations. Radar events can be detected at any node in the network and are notified to the root. One of the change methods defines a "bottom-up" procedure where the root node sends an acknowledged prepare-to-change message to child nodes which in turn forward it until the leaves are reached. Then, a ready-to-change message is sent from the leaves to the parent node, and an acknowledged change-to-channel is sent from the parent node to the leaves. A parent node performs the change only when all of its children have completed the reconfiguration, and so on until the root node is reached. In the other method, the mesh nodes reconfigure their radios in a "top-down" fashion, where parent nodes forward a channel change message (originated from the root) to their children and after that perform the channel change; each message is sent multiple times to each child to increase robustness.

WO 2006/110404 A2, assigned to Interdigital Technology Corporation, and entitled "Method and apparatus for coordinating seamless channel switching in a mesh network" also covers the radar interference scenario. It defines a set of procedures to a) elect a Channel Master node at the beginning of network operation which is responsible for coordinating a set of Mesh Points (MP) operating on the same channel; b) collect radio measurements, including radar pulse events, from the different nodes in the network using layer-2 messages, which are stored in a dedicated information base which also includes channel assignment policies, allowed spectrum bands, timing settings, etc; c) broadcast channel-change messages to set of managed nodes, and receive the respective responses. More specifically, when detecting a radar, the Mesh Points report the trigger condition to the Channel Master and/or to neighbor MPs and wait for a predetermined amount of time for a reply initiating a frequency change from the CM. The CM sends a mesh channel switch announcement (MCSA) either to all or a subset of MPs under its responsibility. The MCSA signaling can affect only one particular mesh-link, a group of mesh-links, or change the settings of all MPs. The MPs which have received the MCSA will change their frequency settings according to the information received by a channel change confirmation message. They may or may not acknowledge successful reception or execution of the changes in the channel change confirmation message to the CM.

The above document also considers a fully distributed implementation where each MP in the network operates independently without the need of CM nodes. In this case, all nodes exchange information about their frequency assignment capabilities and independently take actions to switch channels basing on the data received from the neighbor nodes.

US 2005/0192016 A1, assigned to Telefonaktiegolaget LM Ericsson (publ), and entitled "Method and device for controlling frequency selection within a wireless communication system" discloses continuously or quasi-continuously monitoring and assessing a plurality of frequencies with respect to a radar-like interference signal and allocating a quality parameter to each assessed frequency, the quality parameter indicating the probability that the frequency is occupied, and selecting one or more frequencies in dependence on the allocated quality parameters and subsequent frequency monitoring. The monitoring device may be part of an Access Point or a Central Control or be located remote from but in communication with the AP or CC. The quality parameters can be communicated to further APs or CCs.

US 2004/0156336 A1, assigned to Atheros Communications, Inc., and entitled "Methods for implementing a Dynamic Frequency Selection (DFS) and a temporary channel selection feature for WLAN devices" discloses WLAN devices and techniques in WLAN devices for performing startup scans for radar, identifying backup channels for a channel switch, and efficiently changing channels in the event of radar detection in the operating channel. During startup, the access point can quickly scan multiple channels for radar. In one embodiment, normal operation can begin on the first channel that is found without radar. During normal operation, the access point or one or more stations at the request of the access point can perform short background scans to identify additional radar-free channels. The scanning process can continue until one or two backup radar-free channels are found. At this point, the radar-free channel(s) can be stored in the access point for use during a future channel switch event. The document provides i.e. for setting, based on radar detection, a new channel selected from a previously-scanned channel list; selecting a temporary channel exempt from radar scan and recommencing normal operation using the temporary channel; performing an aggregate background scan on the new channel; and if the new channel passes the aggregate background scan, then recommencing normal operation using the new channel.

US 2009/0116400 A1 to Sekiya, and entitled "Wireless communication apparatus and wireless communication method enabling switching of communication channel" discloses that an access point transmits an instruction frame to a wireless communication terminal when a monitoring unit detects a radar or interference signal in a first communication channel. The instruction frame includes information on a second and a third communication channel, and instructs the wireless communication terminal to switch the communication channel from the first communication channel to at least one of the second and third communication channels.

The Applicant faced the problem of providing a management of radio frequencies that in particular complies with DFS requirements, and provides high performance in the reconfiguration of the network after detection of a DFS event.

The invention is however applicable more in general, whenever there is a need or a desire to move from one frequency channel to another one, for example because of temporary unavailability of the channel, low performance of said channel, high interference, etcetera.

Secondary objects of the present invention are possibly to provide such a frequency management while maximizing the preservation of the existing network topology, avoiding changes in the routing status, and minimizing overall network interference.

BRIEF SUMMARY OF THE INVENTION

In an aspect thereof, the invention relates to a communication node for use in a wireless or hybrid mesh communication system according to claim 1.

In another aspect thereof, the invention relates to a communication node for use in a wireless or hybrid mesh communication system according to claim 6.

In another aspect thereof, the invention relates to a wireless or hybrid mesh communication system according to claim 15.

In another aspect thereof, the invention relates to a method of managing radio frequencies within a wireless or hybrid mesh communication system according to claim 17.

Further features and advantages of the present invention shall become clearer from the following detailed description of some preferred embodiments thereof, provided with reference to the attached drawings.

DETAILED DESCRIPTION OF THE INVENTION

Figure 1:
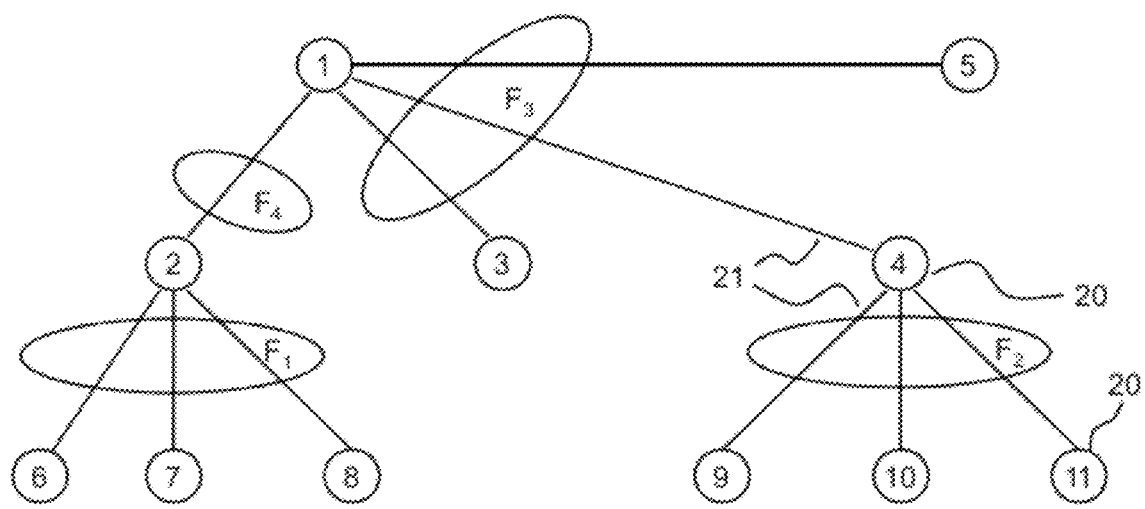
FIG. 1 is a diagrammatic representation of an exemplary communication system.

With reference to FIG. 1, a communication system or network comprises a plurality of communication nodes 20 such as nodes numbered 1 to 11. Communication nodes may also be termed stations or units or terminals or access points.

Each communication node 20 may be or be coupled to any fixed or mobile electronic appliance, such as a computer, a peripheral therefor, a handheld digital device like a personal digital assistant, a cell phone, a data collection device, a sensor for example for area video surveillance, a router for such appliances and especially for video surveillance appliances, and so on.

As will be further detailed below, each communication node may also comprise more than one device connected to each other.

The communication nodes 20 are connected by links 21. The links 21 allow for the communication nodes 20 to communicate, i.e. to exchange any type of information, including video and voice data for any purpose. One of the nodes 20, in particular the root node 1, may also be a portal or gateway to another network, e.g. the internet.

The communication over each of the links 21 may be: wireless not directional communication, e.g. radio communication through not directional antennae; wireless directional communication, e.g. radio communication through directional antennae or infrared communication; or wired communication, e.g. communication through electric wires, buses, optical fiber and similar. As stated above, the invention is particularly concerned with wireless networks, however a hybrid network comprising one or more wired links is not excluded, wherein a link 21 consisting of a wired connection will be considered to be assigned a dummy channel $f_x$ which is not subject to DFS events and is outside the domain of candidate channels discussed below, so that such link is ignored in the channel assignment and DFS procedures discussed below, though being possibly used for the exchange of messages involved in such procedures.

The reference network topology is a tree, as shown by way of an example in FIG. 1. As is well known, node 1 is termed the "root node" or briefly root. Root node 1 is also said to be a "parent node" or briefly "parent" to the nodes 2, 3, 4, 5 directly linked thereto, which are termed "child nodes" or briefly "children". Similarly, nodes 2 and 4 are parent nodes to nodes 6, 7, 8 and 9, 10, 11, respectively. Nodes 3, 5, 6-11 having no children are said to be "leaf nodes" or briefly "leaves" of the tree topology.

Each node 20 in the tree, located at a distance of x hops (tier x) from the root 1, is preferably equipped with two radio interfaces, whose frequencies $\{F_i^0, F_i^1\}$ are assigned as follows: the first one is reserved for the upstream link to the parent (tier x−1), while the second one is shared among the links to the child nodes (tier x+1).

In the present description and in the attached claims, a parent node i, having $F_i^1 = f_k$, and its M children $(j_l, \ldots, j_M)$, all having $F_j^0 = f_k$, are said to form a "family" of nodes, which are tied together by a set of "family links" sharing the same "family channel" or "family frequency" $f_k$. The parent node of a family is the "master node" or "local master" or briefly "master" of the family.

So, with reference to the example network of FIG. 1, nodes 2, 6, 7, 8 form a family operating on channel F1, node 2 being the parent; nodes 4, 9, 10, 11 form a family operating on channel F2, node 4 being the parent; nodes 1, 3, 4, 5 form a family operating on channel F3, node 1 (root) being the parent; and nodes 1, 2 form a family operating on channel F4, node 1 (root) being the parent.

In a perfect tree network as shown in FIG. 1, a leaf node will be a child member of one family, the root node will be a parent member of at least one family, and the other nodes will be a child member of one family and a parent member of at least one family. The invention is however applicable also when the network topology departs from a tree topology. For example, in FIG. 1 there could be a link between nodes 9 and 2, operating either on channel F1, on channel F2, or on another channel.

Figure 2:
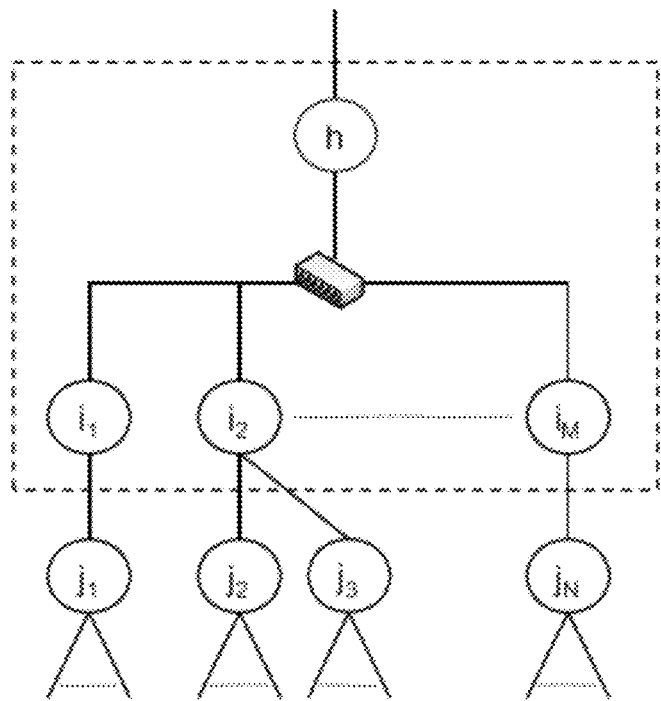
FIG. 2 is a diagrammatic representation of devices connected in wired back-to-back configuration.

Moreover, some devices within the network can be connected in back-to-back configuration using wired links as shown in FIG. 2. From a logical standpoint, as far as the invention is concerned, such devices or nodes h and $i_l, \ldots i_M$ act like a single, distributed parent node having N children $(j_l, \ldots j_N)$.

A similar wired connection may be used to combine two (or more) devices h and $i_l, \ldots i_M$, each having one single radio interface, into one communication node within the above meaning, having two (or more) radio interfaces.

Alternatively, the N downstream links may be assigned the same channel, consuming only one frequency from the available pool. Each child $j_l, \ldots j_M$ will refer to device h for upward signalling during DFS procedure, while devices $i_l, \ldots i_M$ will repeat messages sent by device h downstream.

Combinations of the above alternatives are also envisaged.

According to the invention, the communication nodes 20 have hardware, software and/or firmware modules adapted to implement a method of managing radio frequencies, as disclosed below. Advantageously, each node 20 runs an instance of a set of modules referred to hereinbelow as DFS-Agent (DFSA), implementing the mesh DFS functionality both as a child and as parent node, although a distinct set of modules could be provided for leaf nodes (child only). The root node additionally runs an instance of a special set of modules referred to hereinbelow as DFSA (Root DFSA). Moreover, there can be nodes, termed "monitor nodes", each running an instance of a further special set of modules (DFS Monitor or DFSM hereinbelow). Monitor nodes will preferably be leaf nodes, that use a radio interface for monitoring purposes.

The Parent and Child DFSA capabilities, as well as the Root DFSA and possibly the Monitor DFSA capabilities, are preferably all included in any network apparatus, the network topology and configuration determining which DFSA(s) is (are) actually used by the apparatus each time.

The DFSA on the root node (Root DFSA) maintains a mesh information database (DFS-MIB) comprising, generally stated: a) the mesh topology G; b) the set A (Assigned) of frequencies configured for the various links 21 of the network. i.e. in use; c) the set S of spare channels which can be assigned in case of new DFS events; and preferably d) the set B (Blacklisted) of channels which are currently unavailable due to recent ($<T_{NO}$) detection of radar events. In particular, depending on the local spectrum regulations applied, the set of spare channels S can be further defined as $S = S^R \cup S^O$, where $S^R$ includes the channels which are subject to DFS capability requirements, and $S^O$ is the set of "open" or unrestricted access channels ($S^R \cap S^O = \emptyset$).

As described in more detail hereinbelow, the above sets S and B need not be stored as such. Indeed, subsets Si are in any case stored in the Root DFSA, and the "blacklisted" information may be inferred from a Degree of Preference information.

It is understood that when a frequency or a channel is mentioned in connection with sets and/or messages throughout the present description and the attached claims, a suitable identifier thereof is actually meant.

More specifically, the DFS-MIB includes a Channel Allocation Table storing the assigned and spare frequencies allotted to each parent node of the network, as detailed below.

The DFS-MIB may also include an Interference Matrix. Preferably, the interference information is evaluated and stored at the family level (interference of one family of nodes with another family of nodes), instead of at the single node level as is common in the art. At the mesh bootstrap time, or whenever the Root DFSA node is re-initialized, the Interference Matrix is statically initialized as follows:

$$I(i, j) = \begin{cases} 0 & \text{family } i \text{ and/or } j \text{ are leaves} \\ 1 & \text{otherwise} \end{cases}$$

Alternatively, the interference level can be expressed as a real number in the range [0 . . . 1] depending on topological factors, e.g. distance between the average position of the nodes of families i and j.

During the mesh network lifetime, any DFSA or preferably any dedicated DFSM nodes possibly present in the network will report direct interference measurements performed in their own family with respect to the other families, allowing to populate rows in the matrix with actual figures. The Interference Matrix is also reinitialized whenever a change in the network topology at the family level is detected.

The DFS-MIB may also store a Degree of Preference (DoP) parameter associated to each channel, which is preferably computed by the Root DFSA as follows:

$$DoP(t, f) = \begin{cases} -\infty & f \notin S \\ t - T_R(f) & f \in S^R \\ +\infty & f \in S^O \end{cases}$$

where t is the current time and $T_R(f)$ is the time of the last DFS event detected on channel f.

It is understood that the Blacklisted channels are those channels having $DoP \leq T_{NO}$.

The DFS-MIB may also include results of Off-Channel CAC monitoring procedures concerning spare frequencies and/or link quality measurements and/or statistical data concerning aggregate traffic and/or error rates on individual links and/or number of nodes. Such information is obtained from the parent and child nodes regarding the frequency in use, and from the monitor nodes also regarding the spare frequencies.

At start-up or reboot of the communication system—after suitably obtaining knowledge of the Assigned frequencies (set A) and thus of the Spare frequencies (set S), while there will be no Blacklisted frequencies (set B) at start-up, and/or when major changes in the topology occur, the Root DFSA determines, based on the global knowledge possessed (DFS-MIB), a partition of items in S into disjoint subsets $S_i$, which are assigned to each parent node, i.e. to each sub-tree or family, including the root's own family(ies). A preferred, not limiting embodiment of the algorithm which determines each $S_i$ is illustrated as pseudo-code below:

```
pre_process(G);
foreach i in G { S_i = Ø ;}
sort S by decreasing DoP;
n = 0 ; N_G = max depth of tree G;
while S ≠ Ø {
    G_n = {i : D(i) = n ∧ C(i) > 0}
    sort G_n by decreasing C(i);
    foreach i in G_n {
        f = first element in S ;
        move f from S to S_i;
        if S = Ø break;
    }
    n = (n+1) mod N_G;
}
``` wherein G is the network topology, D(i) is the distance of node i from the root, C(i) is the number of children of node i, and the other notations are as described in the pseudo-code itself.

According to the above pseudo-code, the network topology G is preliminarily pre-processed, e.g. to aggregate devices connected using back-to-back wired links as discussed above with reference to FIG. 2.

Figure 1A:
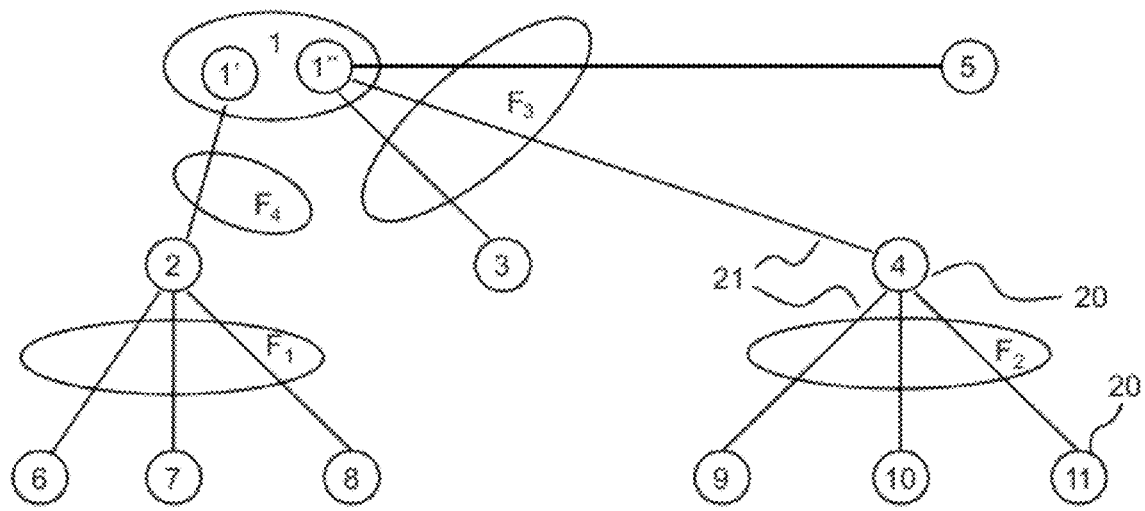
FIG. 1A is a diagrammatic representation of the network topology of FIG. 1 after a pre-processing according to the invention.

Another pre-processing may be to create at the root device, if equipped with two or more radio interfaces, two or more interconnected virtual parent nodes, each of them being assigned a disjoint subset of the children, to the aim of reducing channel reuse in the network. By way of an example, FIG. 1A shows the topology resulting from the pre-processing of the network of FIG. 1. At root node 1, a virtual parent node 1', parent of node 2, and a virtual parent node 1", parent of nodes 3-5, have been created.

Spare frequencies from the global pool S are then sorted by decreasing order of preference (DoP), and assigned to parent nodes (C(i)>0) preferably in breadth-first order from the root node to the leaves. This is because, as will be detailed later, the invention provides under certain circumstances spatial reuse of the frequencies within the network. Lower levels in the tree (higher tier n) have more chances to be able to exploit spatial reuse of the frequencies efficiently because of more distant nodes, lighter aggregate traffic on upstream links, etc.

Preferably, amongst parent nodes which are at the same distance from the root D(i) (set $G_n$), those having the highest number of children C(i) are preferred (by sorting the subset of nodes $G_n$, by decreasing C(i)) in order to facilitate channel change procedures.

The last line of the pseudo-code allows for a second (and possibly further) cycle among parent nodes of the topology so as to allocate all available frequencies to the families, whereby each family possibly has more than one spare frequency.

Figure 3:
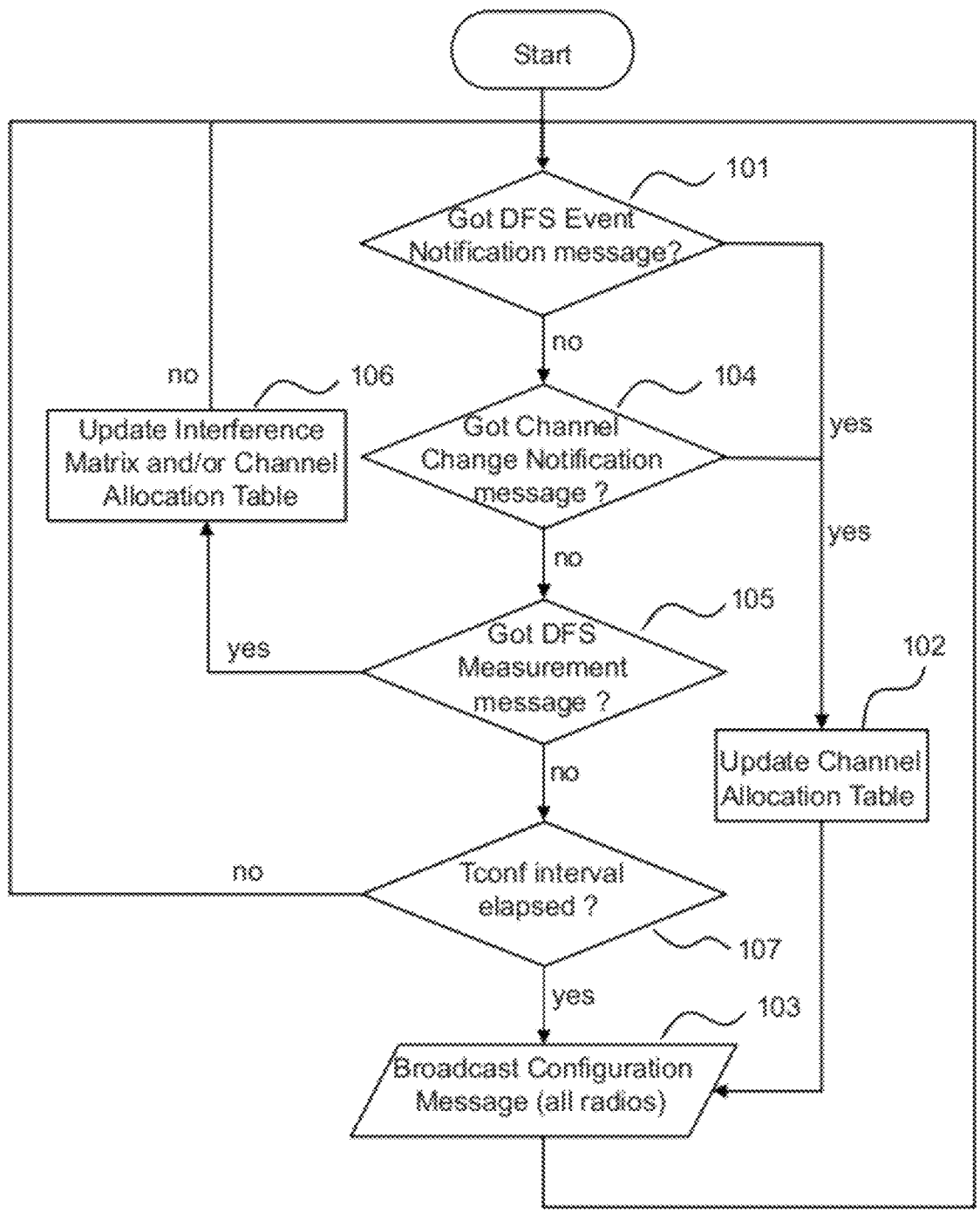

With reference to the flowchart of FIG. 3, the Root DFSA, besides maintaining the Mesh Information Database DFS-MIB, after reserving spare frequency(ies) for its own, periodically broadcasts a configuration packet including a plurality of Configuration Messages each containing the assigned frequency $A_i$ (for check reasons) and the spare frequency(ies) $S_i$ relevant to a specific sub-tree or family.

More specifically, the Root DFSA cyclically performs several steps. In step 101 the Root DFSA checks whether it received a DFS Event Notification message, originated from any DFSA/DFSM of a node of the communication system that detected radar activity on its assigned frequency, or on a monitored frequency, as better disclosed below. In the affirmative, step 102 of updating the Channel Allocation Table for the mesh network is performed. In particular, the frequency where the DFS event occurred will be shifted to the set B of blacklisted channels, possibly together with a timestamp $T_R(f)$ of the event so that it may be removed from set B after the Non-Occupancy time $T_{NO}$. The same information $T_R(f)$ is also used to update the DoP of the frequency.

Thereafter, in step 103 the Root DFSA broadcasts a Configuration Message within the communication system, and step 101 is thereafter returned to.

In case step 101 has a negative outcome, in step 104 the Root DFSA checks whether it received a Channel Change Notification message, originated from any DFSA of a parent node of the communication system that changed channel after a DFS event or for any other reason, as will be seen below. In the affirmative, step 102 of updating the Channel Allocation Table for the mesh network is again performed. In particular, the set A of assigned channels and the set S ($S_i$) of spare channels will be updated, even more in particular, the stored information about the assigned and spare channels related to that particular parent node (and family) are updated in step 102. Also in this case, after step 102, in step 103 the Root DFSA broadcasts a Configuration Message within the communication system, and step 101 is thereafter returned to.

In case step 104 has a negative outcome, in step 105 the Root DFSA checks whether it received a DFS Measurement message, originated from a DFSM or in principle from any DFSA of a node of the communication system. In the affirmative, step 106 of updating the Interference Matrix and/or the Channel Allocation Table—e.g. to include new times $T_R(f)$ of radar events—, for the mesh network is performed.

In case step 105 has a negative outcome, in step 107 the Root DFSA checks whether a preset time interval $T_{conf}$ has elapsed, and in the negative returns to step 101 above. When the time interval $T_{conf}$ has elapsed, in step 103 the Root DFSA broadcasts a Configuration Message directed to all nodes of the communication system.

Thus, the Configuration Message is broadcasted upon a change of the Channel Allocation Table, or in any case periodically every $T_{conf}$ units of time. This ensures that all communication nodes have up-to-date configuration information, and allows new and orphaned nodes to join the network.

Figure 4:
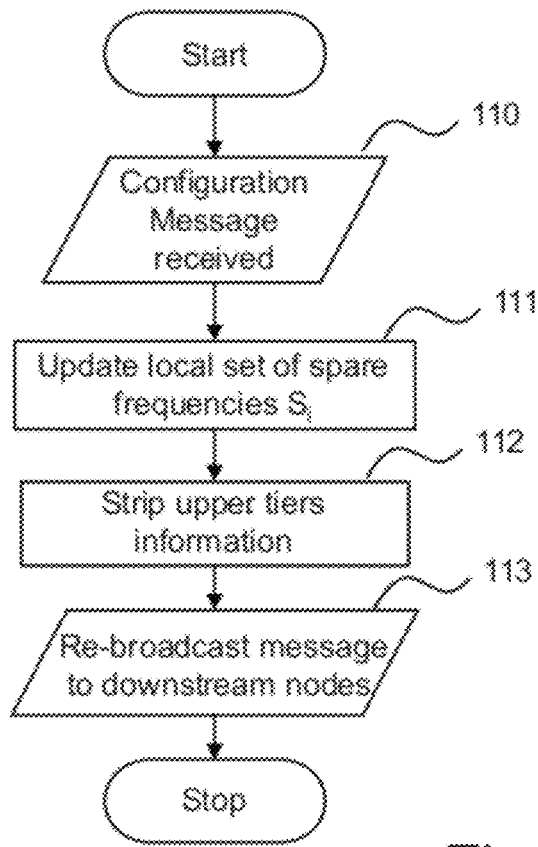
FIGS. 3 to 10 are flowcharts relating to a best embodiment of the management of radio frequencies according to the invention.

With reference to the flowchart of FIG. 4, according to the invention each parent node of the communication system maintains local configuration information about the family it is parent of, and in particular the set $S_i$ of spare frequencies assigned to its family. So, with reference to the example network of FIGS. 1 and 1A, at the root node 1 a set S1' of spare frequencies to be used within the family comprising node 2, and a set S1" of spare frequencies to be used within the family comprising nodes 3-5 will be locally maintained; node 2 will maintain a set S2 of spare frequencies to be used within the family comprising nodes 6-8; and node 4 will maintain a set S4 of spare frequencies to be used within the family comprising nodes 9-11. In step 110, the DFSA receives the Configuration Message (broadcasted by the Root DFSA in step 103). In step 111, the DFSA of the parent node updates the local set of spare frequency(ies) $S_i$ allocated to its family based on the Configuration Message. In step 112, preferably the DFSA strips or prunes higher-level family information (or upper-tiers information) from the Configuration Message, so as to reduce the amount of data propagated in the following step 113 of re-broadcasting the Configuration Message to downstream nodes.

The broadcasting period $T_{conf}$ is long enough so that the signalling traffic generated is negligible (e.g. 60 seconds). If a DFSA entity receives a configuration packet containing local parameters which do not match with the current configuration, it applies the received parameters silently. Alternatively, possible errors are notified to the Root DFSA.

When the pruning step 112 is performed, advantageously the DFSA of a leaf node will either not be involved at all because its parent pruned the entire content of the Configuration Message in step 112 and had nothing to re-broadcast in step 113, or in any case will perform no action in step 111 and following steps because the received Configuration Message will only contain information to the attention of the other child(ren) of its parent.

According to the DFS requirements depicted above, whenever a radar pulse is detected by a DFSM or DFSA on a certain frequency $f_a$, all radio interfaces in the network tuned on that channel—i.e. at least one family as defined above if the frequency is in use—must be reconfigured on another frequency $f_b$ within the preselected Channel Move Time $T_{CM}$ since the event. Note that, during said time interval $T_{CM}$, the network is allowed to cumulatively transmit data for a maximum of Channel Closing Transmission Time $T_{CCT}$, which data should be prioritized for DFSA signalling, namely to exchange information about the DFS Event, the new frequency $f_b$ to be used and the resulting new configuration of the network. Thus, regular data transmissions (data packets, video and voice data etc) over the affected frequency $f_a$ should be stopped immediately, and only be resumed after communication is successfully restored on new frequency $f_b$.

An embodiment of the management of a DFS event according to the invention is disclosed below with reference to the flowcharts of FIGS. 5-8.

The node responsible for coordinating the local channel change from frequency $f_a$ to frequency $f_b$ is the parent node of the family that uses the affected frequency $f_a$. In this respect it is noted that, using local information which is maintained as stated above, each node is able to autonomously determine the family it belongs to, and its parent/child role.

If the node detecting a DFS event over frequency $f_a$ is a child one for that frequency $f_a$, it sends a DFS Event Notification message—preferably acknowledged—to its parent (blocks 150 and 151 of FIG. 7), and then awaits commands to execute the channel change procedure in slave mode (Child DFSA).

Figure 5:
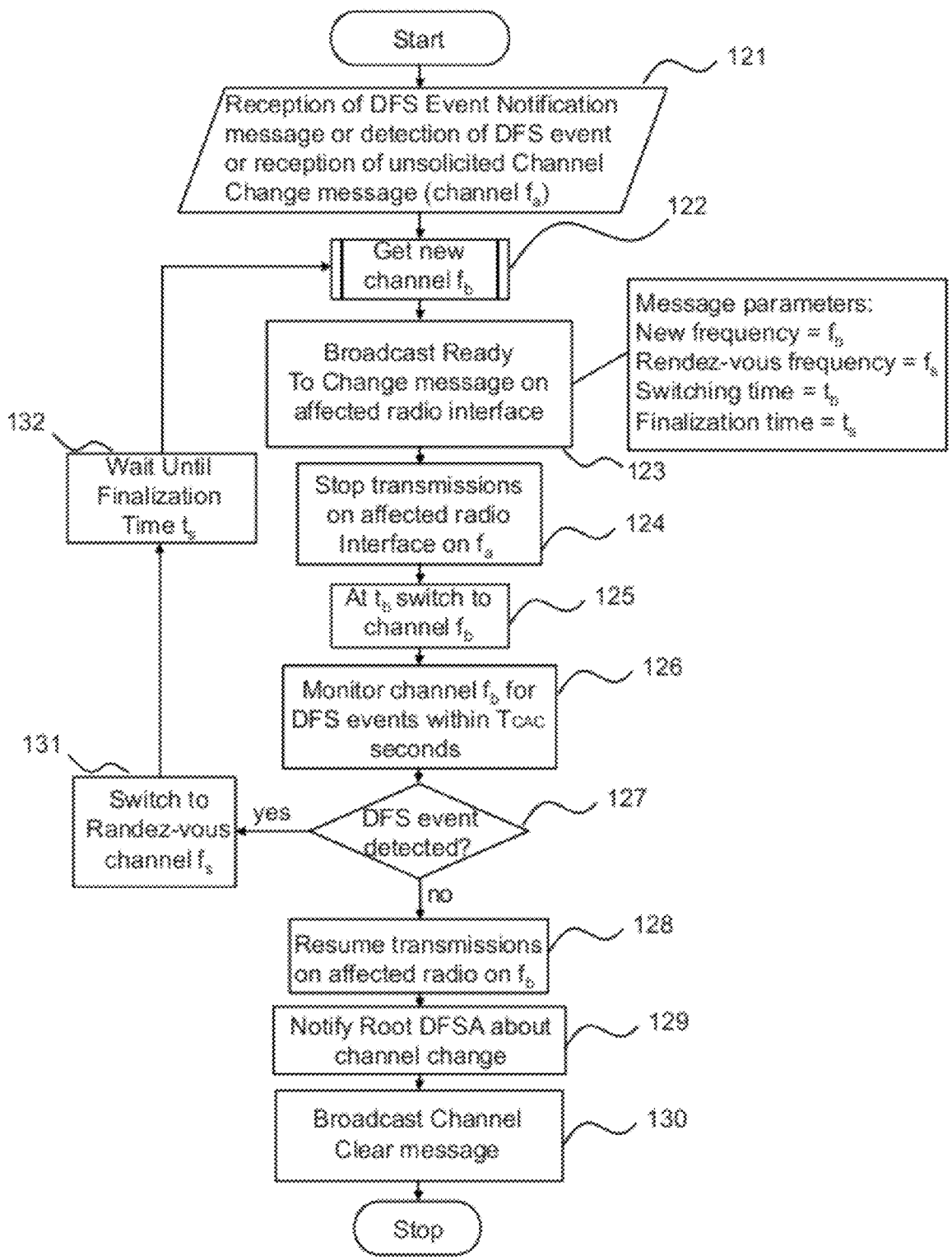

If the node detecting a DFS event over frequency $f_a$ is a parent one for that channel $f_a$, or if the parent node of channel $f_a$ receives a DFS Event Notification from one or more of its children, block 121 of FIG. 5, it initiates a channel change procedure in Parent mode (Parent DFSA).

First, the Parent DFSA of node p determines in block 122 the new frequency $f_b$ to be assigned to the downstream link(s).

Figure 6:
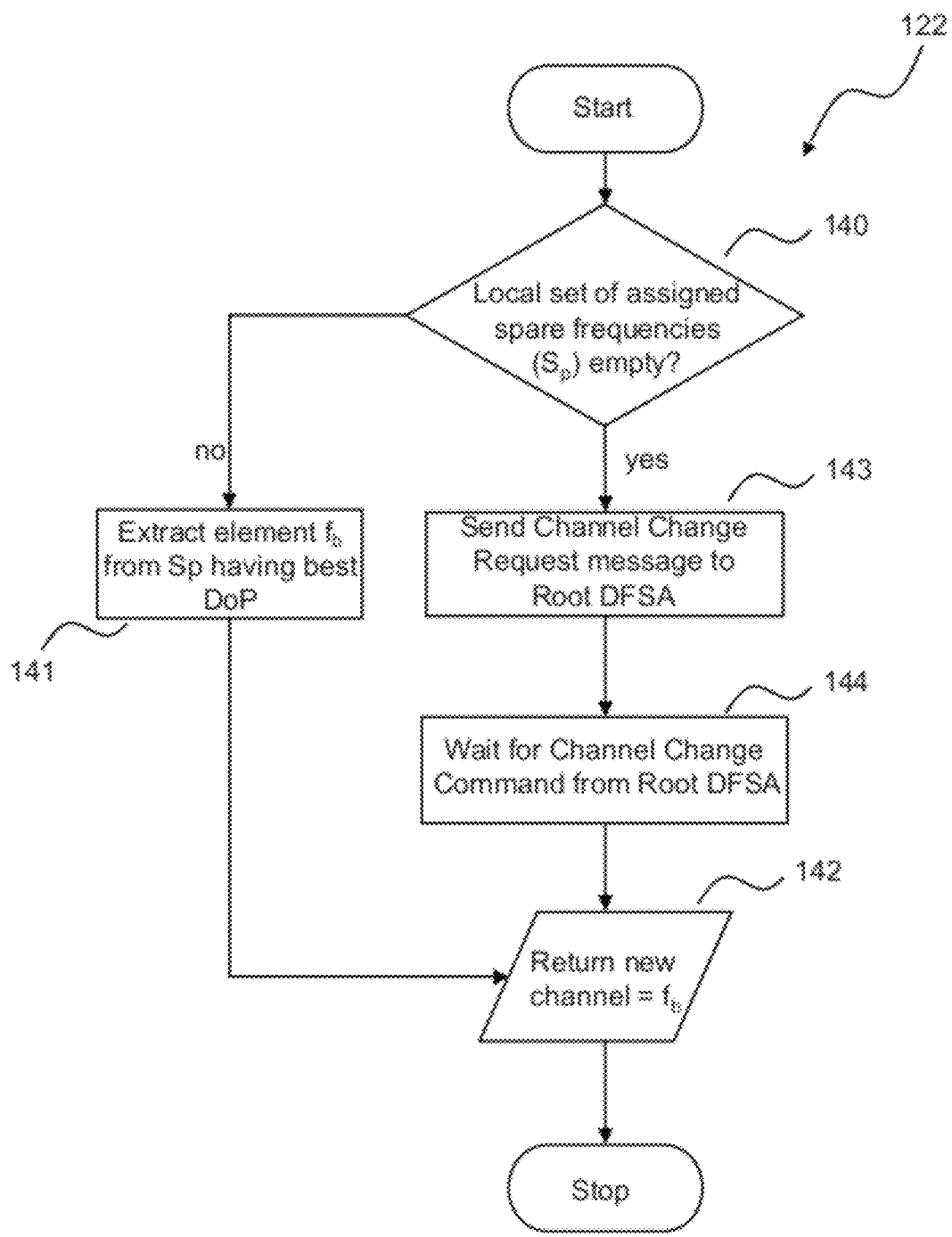

With further reference to FIG. 6, the step 122 of determining or getting the new channel fb depends on whether the local set of spare frequencies $S_p$ allotted to node p is empty or not, as checked in step 140.

If the local set $S_p$ is non-empty, in step 141a frequency is extracted from it and returned as new frequency $f_b$ to be used (block 142). Preferably, the frequency having the best DoP is selected in step 141.

If conversely the local set $S_p$ is empty, then the new frequency $f_b$ must be obtained from the Root DFSA. In step 143 the Parent DFSA sends a Channel Change Request message to the Root DFSA (preferably as unicast message), indicating the channel frequency $f_a$ which needs to be replaced and/or its own node identifier p as the originating node, and preferably a timestamp of the DFS event ($T_R(f)$) which is used by the Root DFSA to update the DoP parameter and to decide when the frequency $f_a$ may be removed from the set B of blacklisted frequencies.

The Parent DFSA then waits, in step 144, for a Channel Change Command in reply from Root DFSA, from which command the new channel frequency $f_b$ to be used is obtained (block 142). The way how the Root DFSA allots the new frequency $f_b$ will be described later on with reference to FIG. 8.

Turning back to FIG. 5, once the new channel frequency $f_b$ is available to the Parent DFSA in step 122, the Parent DFSA then executes a Coordinated Channel Change procedure involving its Child nodes. The flowchart relating to the Child nodes illustrated in FIG. 7 and fully described later on will be also referred to.

The Parent DFSA of the parent node p broadcasts, in step 123, a Ready To Change message on the radio interface of the downstream path which is using the affected frequency $f_a$. The Ready To Change message preferably contains the new frequency $f_b$ which will be used by the child nodes to reconfigure their radio and a timestamp indicating the scheduled time $t_b$ (e.g. T+3 seconds where T is the current time) for the collective radio frequency reconfiguration. The Ready To Change message preferably also specifies a fallback or rendezvous channel $f_s$ known to be radar-free, and a finalization timestamp $t_s$ (e.g. T+60 seconds) indicating the scheduled timeout period, which are used to manage possible error conditions. The rendezvous channel $f_s$ is preferably assigned to each family by the Root DFSA, using the Configuration Packets described above, and it is randomly chosen in the set of open or unrestricted access channels $S^O$ so that it does not collide with the family parent's uplink frequency.

For robustness, the Parent DFSA of the parent node p preferably sends (block 123) the Ready To Change message multiple times (e.g. 10 times) at small intervals (e.g. 200 ms). Deadlines $t_b$, $t_s$ can be specified using absolute timestamps, if a time synchronization service is available in the network, or as a delta time from the packet reception timestamp.

Figure 7:
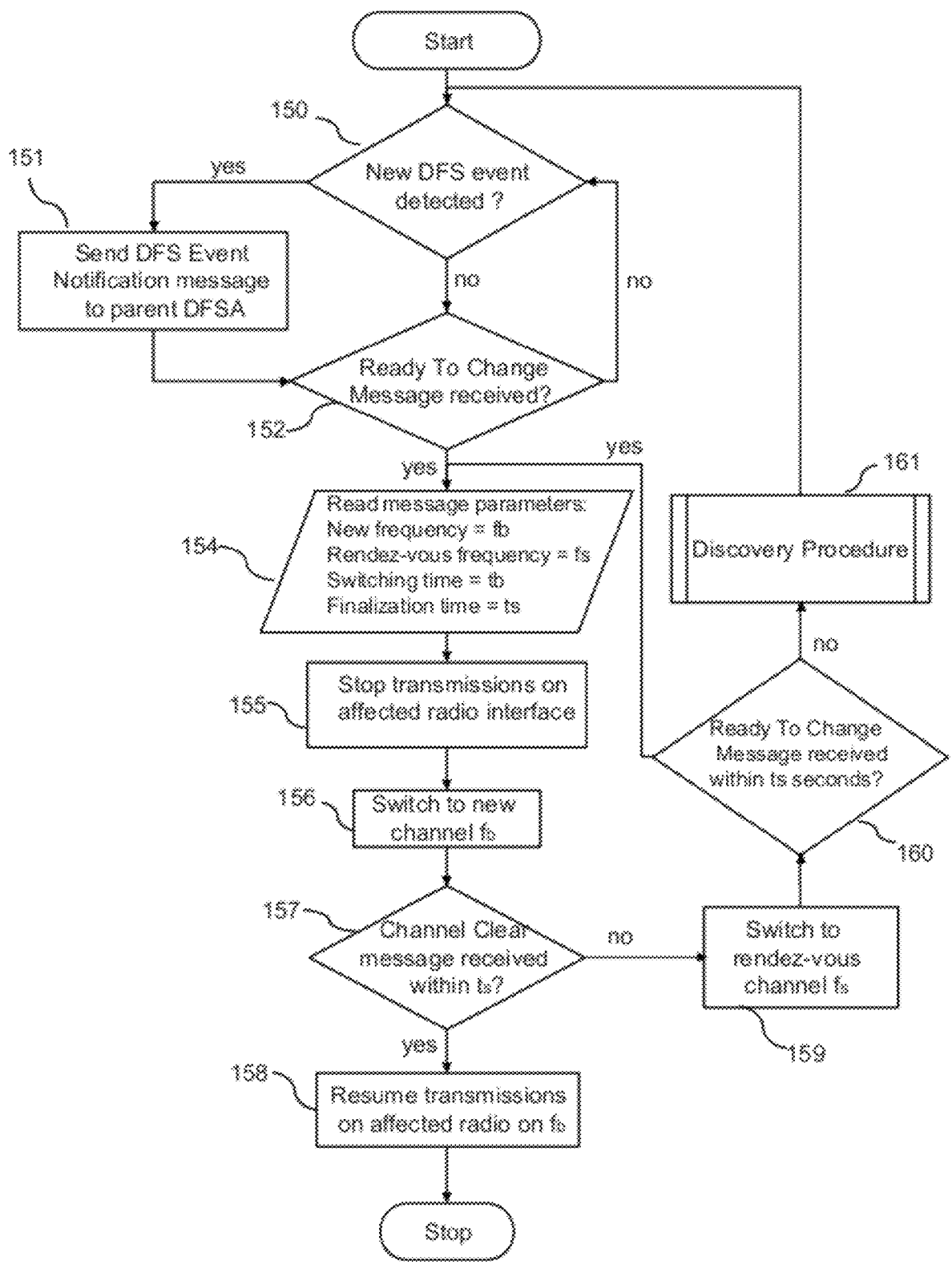

At the scheduled time $t_b$, all nodes affected by the content of the Ready To Change message, i.e. the parent p and its specified children operating on frequency $f_a$, stop the transmissions on the radio interface using the affected frequency $f_a$ (block 124 of FIG. 5 and block 155 of FIG. 7) and reconfigure those radio interfaces to the new channel $f_b$ (block 125 of FIG. 5 and block 156 of FIG. 7). Alternatively, child nodes can perform the channel switch in arbitrary order as soon as they receive the Ready To Change message. However, synchronizing the operations at the specified time $t_b$ helps to preserve network connectivity for a longer time.

Immediately after the channel change, all nodes of the affected family are inhibited from transmitting. In step 126, the parent node p listens on the new channel $f_b$ for a specified amount of time (the Channel Availability Check time $T_{CAC}$). This step 126 may be omitted or shortened by the presence of at least one monitor node that had already listened to that frequency $f_b$ and assured the parent node p and preferably also the Root that no radar activity was performed on channel $f_b$ according to the requirements concerning the Offline CAC procedures specified by the DFS regulations.

If no radar events are detected in the meanwhile on the new frequency $f_b$—exit no of checking block 127—the Parent DFSA in step 128 resumes transmission on the affected radio interface, but on new channel $f_b$.

In particular, preferably after receiving a confirmation that the Coordinated Channel Change procedure has been completed successfully by all child nodes (not shown), the Parent node in step 129 informs the Root DFSA about the action taken by means of a Channel Change Notification message, preferably unicast.

Thereafter, the Parent DFSA in step 130 broadcasts a Channel Clear message on the new frequency $f_b$, preferably multiple times (e.g. 10 times) at small intervals (e.g. 200 ms). When a child node receives (exit yes of block 157 of FIG. 7) a Channel Clear message, it resumes normal network operations on the new frequency $f_b$ (block 158 of FIG. 7).

Note that if a spare frequency $f_b$ is locally available (exit yes of block 140 of FIG. 6), the Parent node does not need to inform immediately the Root node about the DFS event thanks to the disjoint assignment policy which allows for independent Coordinated Channel Change procedures to take place concurrently in different parts of the network. Moreover, the local assignment policy guarantees that channel reuse (described below) is employed only if no spare frequencies are locally available, which allows to postpone the event notification to the Root DFSA since when frequency $f_b$ is locally available, then it is not in use elsewhere in the network and therefore no other channel changes would need to be issued by the Root. If on the other hand the new frequency $f_b$ has been allotted by the Root DFSA (steps 143, 144 of FIG. 6), then the Root DFSA is already pre-informed of the channel change. Thus, steps 129 and 130 may be reversed in order.

If the parent node in step 127 detects a DFS event, and thus determines that the new channel $f_b$ cannot be used, or if for any other reason the new channel $f_b$ cannot be used, in step 131 it moves onto the fallback channel $f_s$, waits until the Finalization Time $t_s$ in step 132 to ensure that all children nodes also moved to the fallback channel $f_s$, and restarts the whole procedure by obtaining a new frequency in step 122 and initiating a new Coordinated Channel Change process on the fallback channel. It is noted that the step 122 of getting a new channel can also be performed before step 132 of waiting until the Finalization Time $t_s$, so as to accelerate the procedure especially in case the new channel must be obtained from the Root DFSA.

Turning now to the child nodes, with reference to FIG. 7 already described in part, the DFSA of the node may perform a step 150 of checking whether a DFS event is detected, and in the negative case a step 152 of checking whether a Ready To Change message is received from its parent node. In case no Ready To Change message is received, step 150 is returned to. Thus, the DFSA continually monitors the frequency $f_a$ in use for any radar activity, and/or monitors the start of a Coordinated Channel Change procedure initiated by its parent upon detection of radar activity by another member of its family.

It is noted that step 150 of monitoring the frequency $f_a$ may be absent for the nodes that do not have such detection capability and rely on their family for information about radar activity.

If step 150, where provided for, has a positive outcome, the child node immediately notifies in step 151 its parent node of the DFS event sending the DFS Event Notification message, preferably unicast, that is received by the parent node in step 121 of FIG. 5.

When the child node DFSA receives a Ready To Change message—exit yes of block 152 —, in step 154 the DFSA reads therefrom the new frequency $f_b$, the switching scheduled time $t_b$, the rendezvous frequency $f_s$ and the related finalization time $t_s$, possibly starting the necessary timers.

Upon receipt of the Ready To Change message, moreover, the child node's DFSA in step 155 immediately—and in any case within $t_b$—stops transmissions on the affected radio interface operating on frequency $f_a$, i.e. that of the uplink with the parent node.

At the scheduled time $t_b$, in step 156 the child node's DFSA switches the affected radio interface to the new channel $f_b$, and waits, until the finalization time $t_s$, for the Channel Clear message, that is broadcasted by the Parent DFSA in step 130 of FIG. 5.

If the Channel Clear message is received within the finalization time $t_s$, exit yes of checking block 157, the child node resumes transmissions on the affected radio interface, on the new frequency $f_b$, in step 158.

If conversely the child node does not receive a Channel Clear message on the new channel $f_b$ within the finalization timestamp $t_s$, exit no of block 157, then in step 159 it tunes to the fallback channel $f_s$ and waits for commands from the parent node on such channel, in particular it waits for a Ready To Change message on channel $f_s$ in step 160. It is indeed recalled that the parent node, in case the new channel $f_b$ is not usable, will restart a new Coordinated Channel Change procedure on the fallback channel $f_s$.

The fallback channel feature disclosed above ensures that the local group of nodes or family does not loose inter-connectivity in case of errors. On the other hand, the fallback channel $f_s$ selected among the open or unrestricted frequencies $S^O$ is preferably used only temporarily, e.g. because of the higher probability of interfering transmissions from other devices.

If the Ready To Change message is not received within the finalization time $t_s$ in block 160, the child node in step 161 enters an Orphaned state and performs a Discovery Procedure detailed later on.

Figure 8:
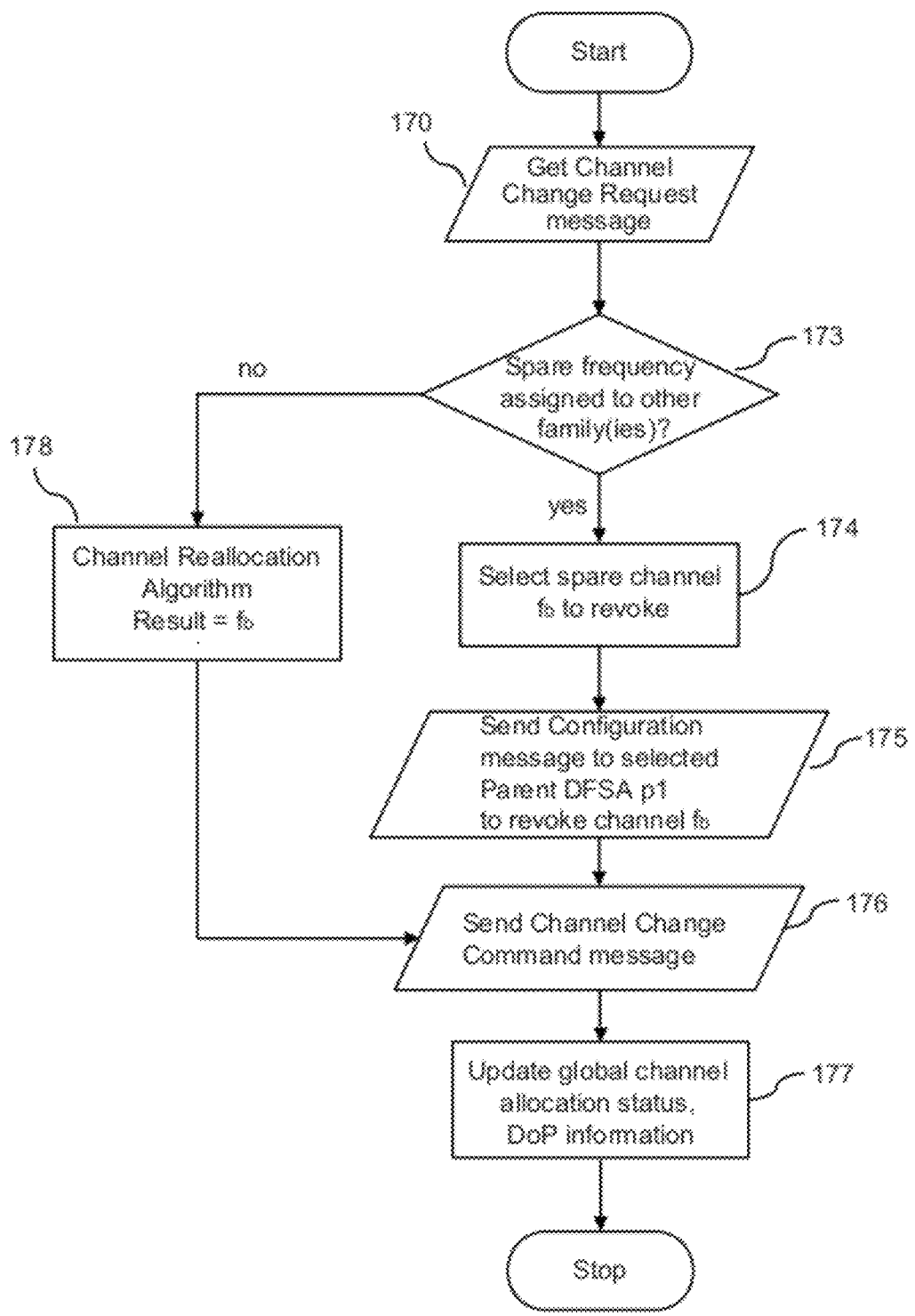

The management of channel changes within the network on the part of the Root DFSA, and in particular a Channel Reallocation procedure by which the Root DFSA allots the new channel $f_b$ to a parent node requesting it, will now be disclosed with reference to FIG. 8.

As stated above, a Channel Reallocation procedure is initiated by the parent node p sending a Channel Change Request message in step 143 of FIG. 6, because a radar event has been detected on its family frequency $f_a$ and it has no frequencies in its spare frequencies $S_i$; the procedure results in the parent node p receiving a Channel Change command from the Root DFSA in step 144 of FIG. 6, and notifying the Root DFSA of the channel change in step 129 of FIG. 5; the notification of the channel change from the parent node p to the root node also takes place when the parent node p itself allocates the new frequency $f_b$.

Thus, in step 170 the Root DFSA gets a Channel Change Request message, and should produce a new channel assignment plan for the network.

If at least one unused spare frequency exists in the network, i.e. S≠∅—exit yes of checking block 173—, then the Root DFSA chooses in step 174 to allocate one of them $f_b$ to the requesting parent node p, revoking its availability to the parent node p1 whose family is the current assignee for channel $f_b$. In case more than a single unused spare frequency exist, the spare frequency $f_b$ to be allocated to the requesting parent node p may be selected as that having the highest DoP, as that of the parent node p1 having the highest number of spare frequencies, as a combination of the above and other criteria. In this respect, reference may also be made to the Channel Reallocation Algorithm described below.

To revoke the availability of the spare frequency $f_b$ to the parent node p1 to which it is currently assigned, the Root DFSA sends in step 175 a Configuration Package message, requesting acknowledgment and preferably unicast, to the Parent DFSA of the selected parent node p1, wherein the set of spare frequencies of node p1 is changed to exclude frequency $f_b$. Such a message is received by the parent node p1 in step 110 of FIG. 4.

It is noted that a spare frequency may also be revoked within an optimization procedure performed by the Root DFSA, e.g. periodically. In this case, the revocation is preferably indirectly communicated through the communication of a different set of spare frequencies contained within the Configuration Message broadcasted in step 103 of FIG. 3.

Upon receipt of the acknowledgment by the parent node p1 to which frequency $f_b$ was formerly assigned, the Root DFSA in step 176 sends the Channel Change Command message, preferably unicast, to the parent node p requesting the new frequency $f_b$ (which receives it in step 144 of FIG. 6), and in step 177 updates the Mesh Information database DFS-MIB and in particular the global Channel Allocation Table.

If no spare frequencies remain in the network—exit no of block 173 —, the Root DFSA will allocate, in step 178, a frequency $f_b$ already in use elsewhere in the network to the requesting parent node p, thereafter performing the above described step 176 of sending the Channel Change Command message to the requesting parent node p, and the above described updating step 177.

According to the invention, as said the Root DFSA manages the Mesh Information database DFS-MIB that contains information on the complete network topology, the individual link metrics and traffic load, etc.

By properly exploiting such information, the Root DFSA may select the frequency $f_b$ to be reused so as to preserve the existing network topology as far as possible, avoiding changes in the routing status, and/or so as to minimize overall network interference.

A preferred embodiment of the algorithm of step 178, that outputs a new frequency $f_b$—and actually a list of new frequencies, in order of preference—to be assigned to the set of links of the family(ies) that operate on the frequency $f_a$ affected by the DFS event, is defined as follows.

Let $E(f_a)$ be the set of families currently assigned to channel $f_a$, which are consequently affected by the reallocation process; set $E(f_a)$ includes the family of requesting parent node p and possibly other families also working on the same frequency, such as a consequence of a formerly performed spatial reuse of frequencies.

Moreover, let P be the set of uplink frequencies of each parent node of families in set $E(f_a)$.

The network interference on any candidate channel f can be estimated e.g. using the following expression:

$$H = \sum_{i \in Q} \sum_{\substack{j \in Q \\ j \neq i}} I(i, j) \cdot a(f_i, f_j)$$

where Q is the set of families in the network; I(i,j) is the interference level between families i and j expressed as a real number in the range [0 . . . 1] and stored in the Interference Matrix as stated above; $f_i$ and $f_j$ are the channels currently assigned to families i and j, respectively; and $a(f_i, f_j)$ is the inter-channel interference coefficient which represents the level of interference generated by simultaneous transmissions on channels $f_i$ and $f_j$ and it is expressed as a real number in the range [0 . . . 1]. A simple expression of $a(f_i, f_j)$ for non overlapping channels is the following:

$$a(f_i, f_j) = \begin{cases} 1 & f_i = f_j \\ 0 & \text{otherwise} \end{cases}$$

However, those skilled in the art can easily devise other expressions for $a(f_i, f_j)$ to take the interference into account in case of overlapping channels.

The algorithm which computes the replacement frequency (ies) for the DFS affected frequency $f_a$ is defined by the following pseudo-code:

```
V = ∅ ;
compute E(f_a) ; compute P ;
foreach f ≠ f_a in A − P {
    foreach l in E(f_a) {
        assume channel f is assigned to family l;
    }
    update I ;
    compute h_f = H ;
    V = V ∪ (f , h_f);
}
sort V by h_f ;
return V ;
``` wherein as stated above, A is the set of the assigned frequencies.

Thus, for each candidate frequency f, the algorithm iteratively evaluates the overall network interference $h_f$ which would be determined by its assignment to the family links affected by the reallocation. The candidate frequencies f are selected among all frequencies in use in the network (set A), preferably excluding the frequencies (set P) that are already used as uplink frequency of at least one parent node of families in set $E(f_a)$. In this manner it is avoided that a network node will operate, after the channel change, on the same frequency both as a child and as a parent node, which would imply a change in the definition of families itself and in the network topology.

The resulting output is the set V of reusable frequencies ordered by increasing interference level. If multiple frequencies are associated to the same value of minimum interference, the frequency in use by the smallest number of nodes will be given a higher order in V.

The first item of set V will be fed to the requesting parent node p as the new channel $f_b$ and sent in the Channel Change Command message in step 176.

It is noted that the spatial reuse of frequencies provided by the invention in case of no spare frequencies being available implies that a DFS event detected on frequency $f_a$ by one family may also involve a second family that is operating on the same frequency $f_a$. As a result, under those circumstances the root node in step 176 will issue unsolicited Channel Change Command messages also to other parent node(s) p2 than the requesting parent node p. Such messages are received by parent node p2 in step 121.

In step 177, the Root DFSA updates the global information base—like in step 102 when it receives a Channel Change Notification in step 104. If needed or desired, the Root DFSA may proactively perform an optimal reallocation of the subsets $S_i$ of spare frequencies assigned to each family in the network at any time during normal operation of the network and/or after a DFS event, possibly anticipating the need to explicitly revoke a channel later on.

Frequencies involved in radar events are moved to the blacklisted set B for the required amount of Non-Occupancy time $T_{NO}$ (not shown in the flowcharts). When the Non-Occupancy time $T_{NO}$ has elapsed, the related DoP will be higher than $T_{NO}$, and those frequencies are re-inserted by the Root DFSA in the set S of spare channels for reassignment to some subset $S_i$ and advertised by means of the periodic announcements in the Configuration Package messages sent in step 103 of FIG. 3.

If spatial reuse of the frequencies has been employed somewhere in the network, the Root DFSA will immediately reassign a frequency for which the Non-Occupancy time $T_{NO}$ has elapsed to one of the families involved in the frequency reuse. The family may be selected according to different criteria, such as the carried amount of aggregate traffic load, the number of nodes, the level of interference (applying an algorithm similar to that of step 178), or randomly.

The reassignment of a frequency after the Non-Occupancy time $T_{NO}$ has elapsed, or for other uncritical maintenance operations, may take place by the Root DFSA triggering a Safe Coordinated Channel Change procedure through a suitable message. The Safe Coordinated Channel Change procedure performed by the parent DFSA is slightly modified with respect to the Coordinated Channel Change procedure detailed above, in the following respects:

- the rendezvous channel $f_s$ is set to the current channel, in use before the change;
- a Ready To Change message having a "safe" flag set is individually sent to each child node using acknowledged unicast transmissions. After the last successful transmission, the parent node switches to the new channel. If any transmission fails—possibly after a suitable number of retries —, the procedure is aborted; child nodes already moved onto the new channel will revert to the original frequency because the Channel Clear message will not be received for a given time (e.g. 10 seconds);
- child nodes perform channel switching immediately upon reception of the Ready To Change message;
- the Channel Clear message is sent by the parent node on the new channel to each child node using unicast transmissions.

Figure 9:
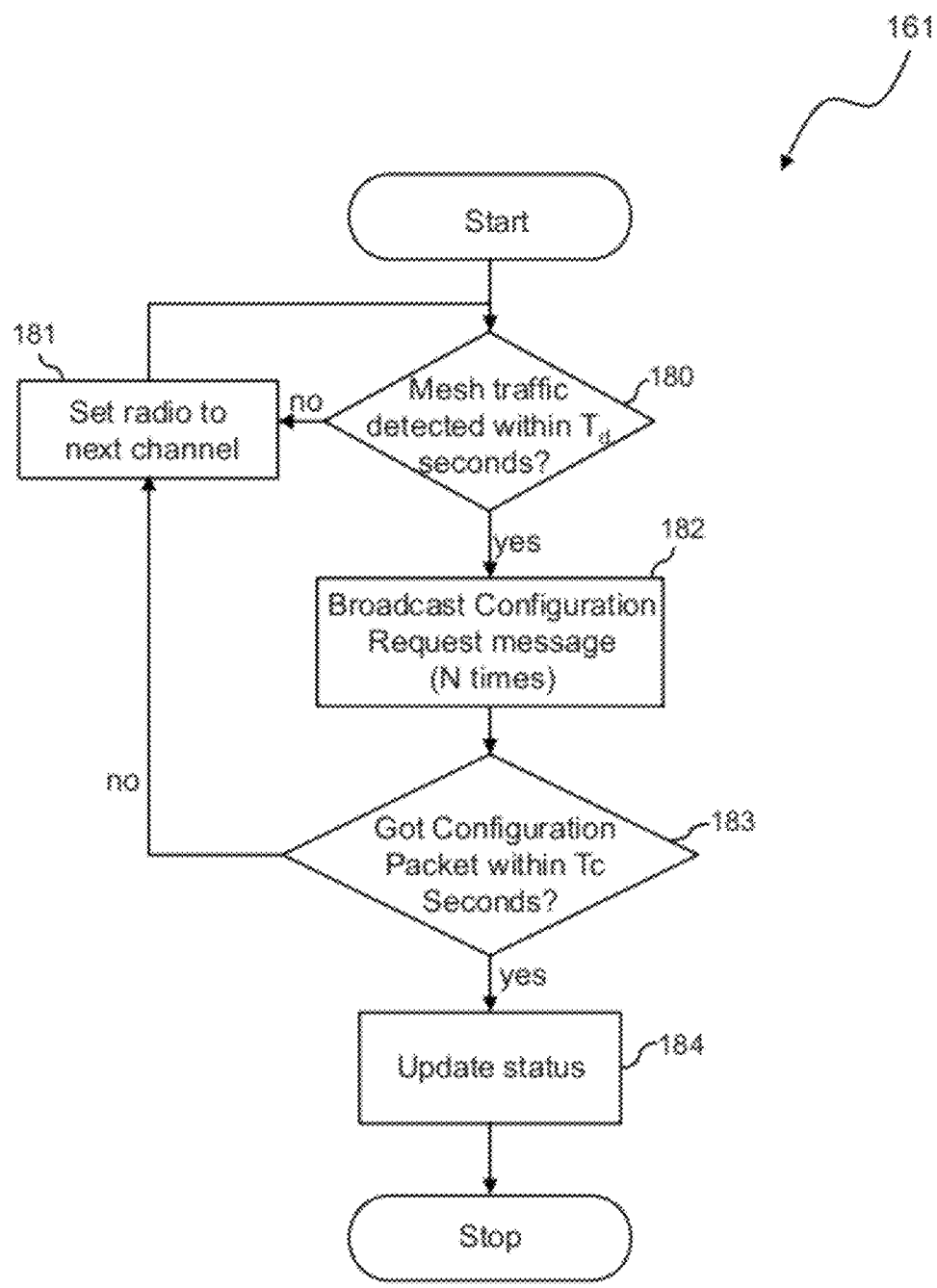

As stated above, if the Channel Change procedure fails for some reason, a child node in step 161 of FIG. 7 enters an Orphaned state and performs a Discovery Procedure. The Discovery Procedure, which is now described with reference to FIG. 9, is used to recover a set of valid configuration parameters also when a child node looses connectivity, e.g. due to communication errors, or is rebooted, e.g. after power loss or node malfunctioning.

Starting with one of its own pre-configured channel(s), in step 180 the orphaned node listens for mesh traffic for a specified amount of time $T_d$, wherein preferably $T_d > T_{CAC}$. Mesh traffic is recognized—and distinguished from other traffic on the same frequency—e.g. from DFSA packets, data packets in a proprietary format of the equipment to be connected into the WMN, etc.

If no mesh traffic is received within the deadline $T_d$—exit no of block 180—or if a radar event is detected in the meanwhile (block 150 of FIG. 7), the node switches the radio interface to another pre-configured channel in step 181 and returns to step 180 to explore such channel. Preferably, several channels are concurrently monitored for mesh traffic using all the radio interfaces of the node (not shown).

As soon as connectivity to the mesh network is detected on a channel, the node repeatedly broadcasts, in step 182, a Configuration Request message on that channel. Preferably the Configuration Request message is broadcasted using layer-2 functionality, i.e. using the MAC address of the node, but not the IP address, so as to avoid modifying layer-3 routing which might introduce temporary instability in the network.

Any surrounding DFSAs belonging to the local family should be able to reply with data from the last valid Configuration Packet they had received. Due to the employment of directional antennas, it is highly probable that mesh traffic comes indeed from the local family the node was part of before entering the orphaned status, and therefore there are good chances that the orphaned node obtains the configuration data within a given timeout $T_c$ (e.g. 10 seconds), as checked in block 183, and thus updates its configuration in step 184.

It is noted that, if the local family is currently involved in a Coordinated Channel Change procedure, the replying node(s) will re-transmit the Ready-To-Change message and the orphaned node will join the process.

If the orphaned node does not receive any reply within the given time $T_c$—exit no from block 183—it returns to step 181 to monitor a further channel, if available.

Upon failure to obtain valid configuration data on all of its pre-configured channel(s), the orphaned node sends (not shown) a Configuration Request to the Root DFSA—whose address is known by all nodes—using layer-3 connectivity, even if this might introduce temporary instability in the network.

If even this process fails, the node leaves the channel and continues the Discovery procedure cyclically until a valid configuration is successfully received.

As briefly stated above, in a communication system according to the invention there can optionally be "monitor nodes", running a DFS Monitor (DFSM), dedicated to radio measurements for system optimization purposes, which provide interference data to the Root DFSA. The presence of one or more DFSM(s) increases the performance and the accuracy of the system. Preferably, at most a single DFSM node is provided in each family of the network, to avoid inconsistent measurements from more DFSMs; alternatively, the measurements from more DFSMs can be averaged or otherwise evaluated by their common parent node.

A Monitor node preferably is fully dedicated to the DFS functionality and does not participate in the network data delivery service, although a node having a sufficient number of radio interfaces and sufficient resources may be further configured as Monitor node, still participating in the network delivery service.

When a node is configured to operate as a Monitor, it participates in normal DFSA procedures—as stated above, preferably as a child, leaf node—, and additionally performs the task of periodic or continuous frequency scanning to perform regulation-compliant Off-Channel Channel Availability Check and interference measurements.

The DFSM node uses one of its radio interfaces to scan the available channel(s), and in particular the spare frequencies assigned to its family, in order to detect the presence of radars according to the specific country specifications. This information can provide significant performance gains in the execution of the Coordinated Channel Change Procedure by the family of the Monitor node, since channels assessed to be radar-free in advance need not be subject to the Channel Availability Check silence period of step 126 of FIG. 5—i.e. $T_{CAC}=0$, which greatly reduces the packet forwarding interruption time experienced by data flows.

The frequency scanning procedure of monitor nodes may also be used to collect measurements and/or statistics concerning external sources of traffic; this may include e.g. MAC addresses (from which family identifiers can be deduced), associated Received Signal Strength Intensity (RSSI) values, and overall channel utilization.

Figure 10:
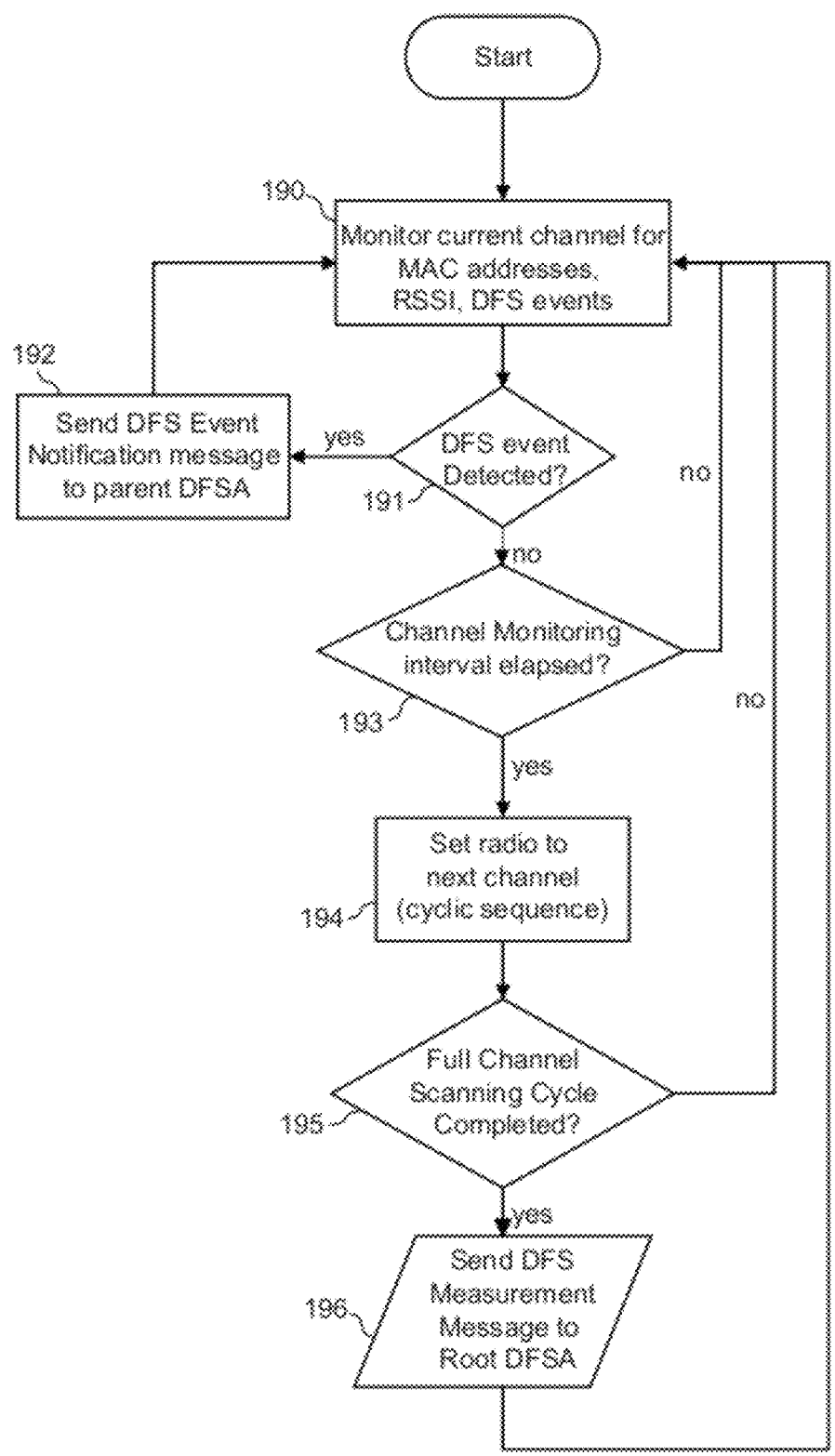

More in particular, with reference to FIG. 10, in a step 190 the Monitor DFSA monitors the current channel for MAC addresses, RSSIs, and DFS events.

If a DFS event is detected—exit yes of check block 191—, then in step 192 the Monitor DFSA sends a DFS Event notification message to the Parent DFSA, preferably unicast. Such message is received by the Parent DFSA in step 121 of FIG. 5, and processed as discussed above.

If a DFS event is not detected—exit no of check block 191—, then in step 193 the Monitor DFSA checks whether a suitable Channel Monitoring Interval has elapsed, and in the negative case returns to step 190 so as to collect significant data on the selected channel.

After the Channel Monitoring Interval has elapsed—exit yes of block 193—the Monitor DFSA selects in step 194 a new channel to monitor.

The Monitor DFSA then checks in step 195 whether a full scanning cycle has been completed, i.e. whether all the available frequencies have been examined in the current cycle, and in the negative case the scanning is continued from step 190.

When all the channels have been monitored for the preselected time interval each—exit yes of block 195—the Monitor DFSA in step 196 sends the collected data to the Root DFSA node by means of a DFS Measurement Message report. Such message is received by the Root DFSA in step 105 of FIG. 3, and processed as discussed above.

Alternatively or additionally to the periodic issue of the DFS Measurement Message report every channel scanning cycle, a report may be issued at preset time intervals.

The Root DFSA exploits the information received by the various DFSM nodes in the network e.g. to a) update the Interference Matrix in step 106 of FIG. 3, b) update the Channel Allocation Table in particular with respect to the DoP of the monitored channels, and c) optimize the allocation of spare frequencies to the different families based on the results of the Off-Channel CAC procedures performed.

If the DFSM node has only a single radio interface, the device may lose connectivity if a channel switch triggered by a DFS event occurs during the periodic scanning activity on a different channel than that in use by the family the DFSM node is part of. In this case, the node detects its orphaned status like a normal DFSA node and performs the Discovery Procedure.

As an alternative to the cyclic scanning of all frequencies, the Monitor DFSA may perform a continuous monitoring for DFS events on the first spare frequency of the set $S_i$ of its family to ensure that the channel is radar-free.

It is highlighted that the above disclosed Monitor DFSA capabilities may be advantageous even in a communication system managing the DFS events in another way from that disclosed above, and in particular where the spare frequencies are not assigned in advance to the various parent nodes. Those peculiar features of the Monitor DFSA may thus represent inventive aspects per se.

It is highlighted that the above described management of the radio frequencies, wherein independent sets of spare frequencies are assigned to the parent nodes, allows for very quick and efficient channel changes, autonomously managed locally by the parent node. The root node is only involved when the local parent node has no spare frequencies in its set, which also enhances the channel changes and increases network performance by also reducing the traffic related to frequency management. The root node plays a sort of arbitration role. Multiple DFS events occurring in different parts of the mesh are also independently and concurrently managed. If the DoP parameter, and/or the Interference Matrix are used, the frequencies may be assigned in a very efficient way.

Although the channel changes have been disclosed in connection with the detection of radar activity, the frequency managing of the invention is advantageous when changes are dictated or desired for any other reason. Thus, the DFS Event Detection and Notification referred to above should only be construed as a non limiting example of other detection and exchange of messages.

Although a tree topology and a root node have only been referred to above, it will be understood that the invention applies to any other network topology, provided that it may be regarded as comprised of one or a plurality of local families constituted by neighbouring nodes which can communicate directly and one global master node as far as the DFS management is concerned. In principle, the tree topology and/or hierarchy used for network traffic need not correspond to the tree topology and/or hierarchy in terms of DFS agents.

The preceding description and drawings merely explain the invention and the invention is not limited thereto, as those of ordinary skill in the art who have the present disclosure before them will be able to make changes and variations thereto without departing from the scope of the present invention.

What is claimed is:

1. A root communication node for use in a wireless or hybrid mesh communication system, the communication system comprising at least one family formed of a parent node and at least one child node communicating over a frequency channel, configured to:

assign a set of spare frequency channel channels to each of the at least one family, wherein the set of spare frequency channels is pre-assigned to the parent node of the at least one family before a need to change frequency channels arises, and wherein the spare frequency channels can be selected by the parent node for changing the frequency channel, and receive a request for a new frequency channel from a parent node of the at least one family, the request being sent by the parent node when its set of spare frequency channels is empty, and to provide the new frequency channel to the parent node.

2. The root communication node according to claim 1, further adapted to revoke the new frequency channel from the set of spare frequency channels of another family.

3. The root communication node according to claim 1, further adapted to select the new frequency channel as an in-use frequency channel assigned to a parent node of another family.

4. The root communication node according to claim 3, further adapted to select a new frequency channel that minimizes interference over the communication system.

5. The root communication node according to claim 1, further adapted to recognize a Dynamic Frequency Selection event over a frequency channel and to provide the new frequency channel to all parent nodes of families communicating over the frequency channel.

6. The root communication node according to claim 1, wherein the spare frequency channels are assigned to parent nodes of the at least one family in a breadth-first order according to a decreasing degree of preference, and in a same tier in order of decreasing number of child nodes.

7. The root communication according to claim 1, further adapted to store and maintain information relating to a topology of the communication system, to a frequency in use in each local family, and to the set of spare frequency channels assigned to each parent node of the at least one family.

8. The root communication node according to claim 7, further adapted to store and maintain information about at least one of frequency channels temporarily not usable, a level of interference among families within a communication network, a degree of preference of frequency channels, and traffic matrices.

9. The root communication node according to claim 7, further adapted to receive the information from communication nodes of a network.

10. The root communication node according to claim 1, wherein the root communication node comprises a root node, and wherein the root node is part of a communication system that further comprises at least one local parent node and at least one child node communicating with the at least one local parent node over a second frequency channel.

11. The root communication node according to claim 10, further adapted to monitor at least one frequency channel for at least one of Dynamic Frequency Selection events, Media Access Control addresses, and Received Signal Strength Intensity.

12. The root communication node according to claim 1, wherein the set of spare frequency channels is pre-assigned to the parent node upon at least one of a start-up of the communication system, a reboot of the communication system, and when significant changes to a topology of the communication system occurs.

* * * * *